Patented Aug. 26, 1924.

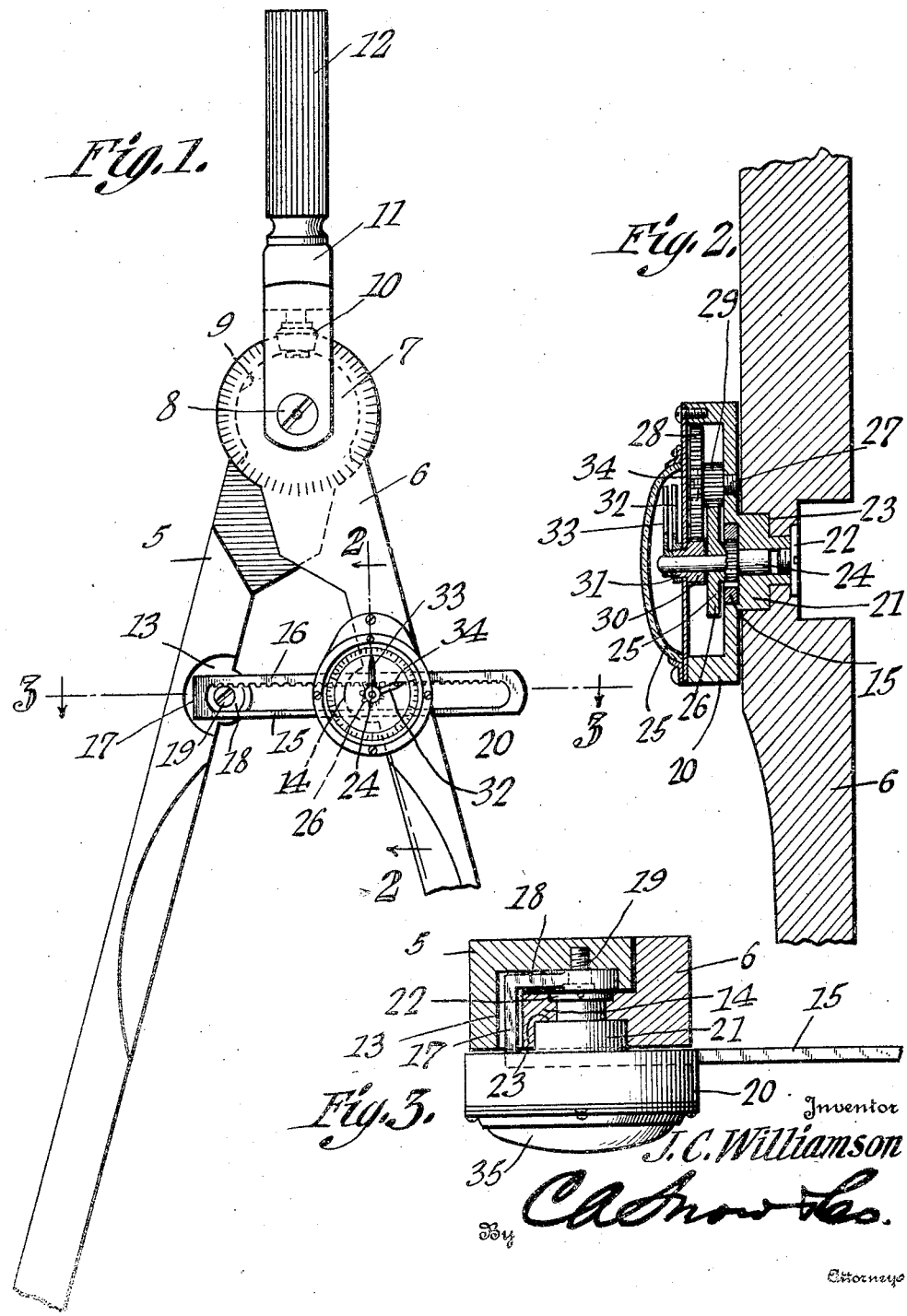

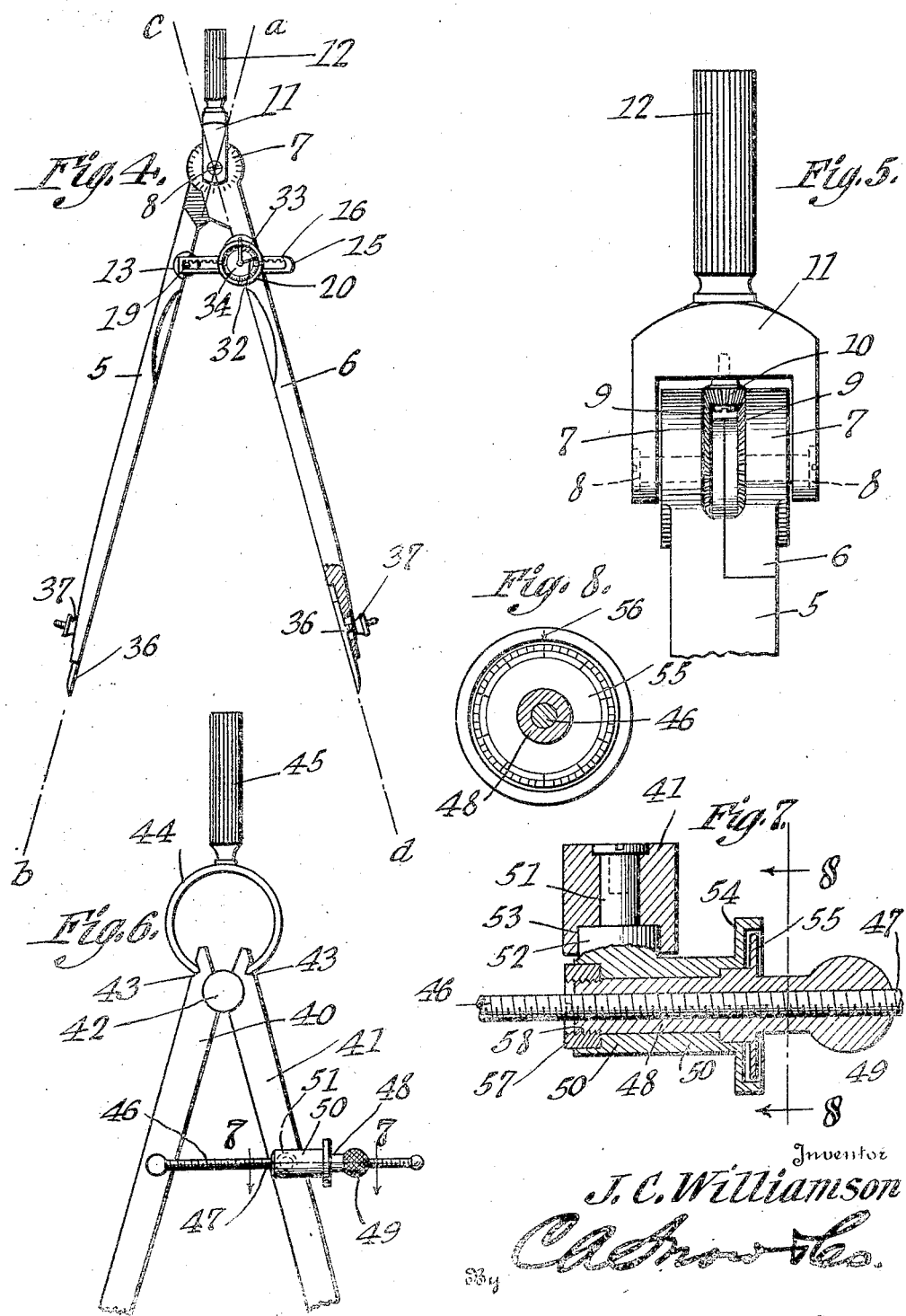

1,506,704

UNITED STATES PATENT OFFICE.

JAMES C. WILLIAMSON, OF CORDELE, GEORGIA.

CALIPER.

Application filed July 16, 1923. Serial No. 651,854.

*To all whom it may concern:*

Be it known that I, JAMES C. WILLIAMSON, a citizen of the United States, residing at Cordele, in the county of Crisp and State of Georgia, have invented a new and useful Caliper, of which the following is a specification.

This invention relates to measuring instruments such as dividers or the like, the primary object of the invention being to provide means to be carried by the instrument for registering or recording the distance between the free ends of the legs thereof.

Another important object of the invention is to provide an instrument especially designed for measuring distance between given points, novel means being provided for supporting the registering or indicating member to insure accuracy.

A still further object of the invention is to provide means for supporting the registering or recording device to allow the leg members of the instrument to move into close engagement with each other, to permit the measurement of distance from the zero mark.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of an instrument constructed in accordance with the invention.

Figure 2 is a sectional view taken on line 2—2 of Figure 1.

Figure 3 is a sectional view taken on line 3—3 of Figure 1, parts thereof being shown in elevation.

Figure 4 is a diagrammatical view setting forth the relation between the pivot points of the instrument.

Figure 5 is a detail view disclosing the means for holding the finger piece of the instrument vertical.

Figure 6 is an enlarged elevational view disclosing a modified form of the registering device.

Figure 7 is a sectional view taken on line 7—7 of Figure 6.

Figure 8 is a sectional view taken on line 8—8 of Figure 7, parts of the instrument being removed.

Referring to the drawings in detail, the instrument includes opposed leg members 5 and 6, which legs are formed with heads 7 at their connected ends, which heads are provided with opening to receive the connecting screw 8 which permits of movement of one leg member with respect to the other leg member. This screw 8 is preferably hollow to receive a pin or other centering device, permitting the instrument to be used as a protractor. The adjacent edges of the heads 7 are formed with teeth 9, which teeth are engaged by the beveled pinion 10 carried by the operating frame 11 that has connection with the instrument through the screw 8, whereby the frame 11 and finger piece 12 carried thereby will be held in upright positions at all times permitting the instrument to be operated with facility.

The leg 5 is cut away at 13 to provide a clearance to receive the extension 14 of the opposed leg, when the legs 5 and 6 are moved into engagement with each other. Supported by the leg 5 is a bar 15 which is provided with an elongated opening, one wall of the opening being formed with teeth 16 providing a rack. As shown, this bar 15 is formed with a right angled portion 17 terminating in an end portion 18 lying in parallel relation with the bar 15, where the same is formed with an opening to receive the securing screw 19 on which the bar 15 is pivotally supported.

Carried by the leg member 6 is a housing 20 formed with an extension 21 which is hollow to receive the securing screw 22, the extension 21 having shoulders adapted to engage the shoulders 23 formed at the base of the opening in which the extension is positioned.

Supported within the hollow extension 21 is a shaft 24 on which is secured the gear 25 having an extension 26 formed with teeth providing a pinion to be engaged by the teeth 16 of the bar 15. Mounted in the housing 20 is a shaft 27 on which is mounted the pinion 28 carrying the pinion 29 that meshes with the gear 25. The pinion 28 meshes with the gear 30 that is loosely mounted on the shaft 24, which gear 30 is formed with a reduced portion 31 on which the indicating head 32 is mounted, so that upon rotary movement of the gear 30, the hand will be rotated accordingly.

Associated with the indicating hand 32 is a hand 33 that is mounted on the outer end of the shaft 24, the gearing for transmitting motion from the shaft 24 to the gear 30 being such as to cause the indicating hand 33 to move a predetermined distance, while the indicating hand 32 is moving to divide the unit indicated by hand 33, into fractions.

These indicating hands 32 and 33 operate over the dial 34, which dial is formed with graduations indicating inches and fractions of inches, however it is to be understood that the graduations on the dial 34 may be changed to meet various requirements of use.

A cover 35 may be employed to house the dial 34, the cover being preferably formed of transparent material in order that the indicating hands may be clearly visible, and the graduations on the dial accurately read.

It might be further stated, that the form of instrument as shown and described, is especially designed for draftsman's use, the construction being such as to permit the legs of the instrument to be readily and easily adjusted with respect to each other when making the required measurements.

At the free ends of the leg members 5 and 6 are removable points 36 which are held in position by means of the eye bolts 37 so that when the points 36 become worn to destroy the accuracy of the instrument, it is only necessary to compensate for such wear by moving the points 36.

Thus it will be seen that due to the construction as recited, the bar 15 and housing 20 are pivotally supported, allowing the bar 15 to move in a direct line with respect to the housing and insure the alignment of the points 36 with the pivot screw 8 to insure the accuracy of the instrument.

In the form of the invention as illustrated by Figure 6 of the drawings, the instrument is especially designed for machinists' use, wherein it is desirable to secure the leg members of the instrument in their positions of adjustment.

The instrument embodies opposed legs 40 and 41, which legs are pivotally connected at 42 and are provided with cut out portions 43 to receive the free ends of the spring member 44 which carries a finger piece 45 and by means of which the tool may be operated.

Pivotally secured to the leg 40 is a rod 46 which is formed with a threaded portion 47 that moves through the internally threaded sleeve 48, the sleeve 48 being formed with a knurled finger piece 49 to permit the sleeve to be readily rotated. The sleeve housing 50 is pivotally connected to the leg member 41 at 51, and includes an offset portion 52 that moves in a suitable recess portion 53 of the leg member 41. The sleeve 50 is formed with an enlarged portion 54 in which the dial 55 is located, the dial 55 being formed with suitable graduations as indicated by Figure 8 of the drawings, which graduations cooperate with the indicator 56 carried by the enlarged portion 54, so that movement of the sleeve within the enlarged portion 54, may be registered.

In order that the members 48 and 50 may be removed from the rod 46, a threaded collar 57 is provided and moves over the threaded end 58 of the sleeve 48. From the foregoing it will be obvious that when a measurement has been made, the leg members 40 and 41 may be securely held in their positions of adjustment eliminating any possibility of the leg members being moved when the instrument is in use.

It might be further stated that a plurality of these dials may be supplied in the housing, means being provided for holding them normally out of use so that after the material has been set indicating certain measurement on one dial, if it is desired to add distance thereto, another dial may be thrown into operation and the leg members moved until the indicator thereof shows that fraction of an inch to be added. It will thus be understood that the leg members will be moved, the combined distances as shown on the dials.

What I claim as new is:—

1. In a measuring instrument, pivoted leg members, a dial supporting housing pivotally supported by one of the leg members, a bar having an elongated opening, pivotally supported by the opposed leg member, teeth formed along one wall of the elongated opening, indicating hands supported in the housing and adapted to move over the dial, and means associated with the indicating hands and engaged by the teeth of the bar for rotating the hands over the dial.

2. In a measuring instrument, a pair of pivoted leg members, a dial supporting housing supported by one of the leg members and adapted to move with respect thereto, indicating hands within the dial supporting housing, gearing associated with the indicating hands, and pivoted means carried by the other leg and cooperating with the gearing for moving the indicating hands when the leg members are moved with respect to each other.

3. In a measuring instrument, a pair of pivoted leg members, a dial supporting housing pivotally supported by one of the leg members, indicating hands in the housing, gearing for operating the hands, a bar having pivotal connection with the opposite leg member and cooperating with the gearing for moving the indicating hands when the leg members are moved with respect to each other.

In testimony that I claim the foregoing as my own, I have hereto affixed my signature in the presence of a witness.

JAMES C. WILLIAMSON.

Witness:
  I. E. SIMPSON.